United States Patent
Hu et al.

(10) Patent No.: US 7,697,828 B2
(45) Date of Patent: Apr. 13, 2010

(54) INTEGRATED OPTICAL FOCUSING/ZOOMING SYSTEM

(75) Inventors: Xiaoping Hu, Shenzhen (CN); Bin Tian, Shenzhen (CN); Yi Li, Shenzhen (CN); Tieying Zhou, Beijing (CN); Cunyue Lu, Beijing (CN); Yu Chen, Beijing (CN)

(73) Assignees: Boly Media Communications (Shenzhen) Co., Ltd., Shenzhen (CN); Tsinghua University, Beijing (CN)

( * ) Notice: Subject to any disclaimer, the term of this patent is extended or adjusted under 35 U.S.C. 154(b) by 322 days.

(21) Appl. No.: 11/783,971

(22) Filed: Apr. 13, 2007

(65) Prior Publication Data

US 2007/0242941 A1    Oct. 18, 2007

(30) Foreign Application Priority Data

Apr. 14, 2006   (CN) .................. 2006 1 0035079

(51) Int. Cl.
*G03B 17/00* (2006.01)
*G03B 13/00* (2006.01)
*H01L 41/00* (2006.01)
*G02B 7/02* (2006.01)

(52) U.S. Cl. .................. 396/79; 348/345; 348/374; 396/529; 310/316.02; 359/824

(58) Field of Classification Search .............. 348/208.4, 348/374; 396/79, 529; 359/824; 310/311, 310/316.02
See application file for complete search history.

(56) References Cited

U.S. PATENT DOCUMENTS

| | | | |
|---|---|---|---|
| 5,202,717 A * | 4/1993 | Ookubo et al. ............... | 396/81 |
| 6,748,166 B2 * | 6/2004 | Watanabe et al. ............ | 396/79 |
| 6,940,209 B2 | 9/2005 | Henderson | |
| 7,203,011 B2 * | 4/2007 | Ito et al. ..................... | 359/811 |
| 7,221,526 B2 * | 5/2007 | Manabe ...................... | 359/824 |
| 7,298,564 B2 * | 11/2007 | Rouvinen et al. ........... | 359/824 |
| 2003/0227559 A1 | 12/2003 | Rouvinen et al. | |
| 2005/0253951 A1 * | 11/2005 | Fujimoto et al. ............ | 348/335 |

(Continued)

FOREIGN PATENT DOCUMENTS

CA        2629948        5/2007

(Continued)

*Primary Examiner*—W. B. Perkey
*Assistant Examiner*—Dennis Hancock
(74) *Attorney, Agent, or Firm*—Jacobson Holman PLLC (57) ABSTRACT

An integrated optical auto focus and zooming system is provided, which includes a first optical lens, a first hollow casing, a second hollow casing, a plurality of piezoelectric elements. The first optical lens is placed in the first hollow casing, the first hollow casing and the second hollow casing are screwed with each other, and the plurality of piezoelectric elements are attached either on the first hollow casing or the second hollow casing. Upon the excitation of mechanical vibrations by the plurality of piezoelectric elements, a traveling wave is generated on the attached casing, so as to drive the other casing to rotate and then to move axially. Additional lens groups and casings can be added in the same way so to achieve multiple relative motions between lens groups and image sensor, and thus achieving the objectives of focusing and zooming. The present invention integrates the motor into the lens and hence eliminates the transmission mechanism, leading to simple structure, high efficiency, and multiple advantages in size, cost, and efficiency, etc., and thus can be very useful.

16 Claims, 6 Drawing Sheets

U.S. PATENT DOCUMENTS

| | | |
|---|---|---|
| 2006/0044455 A1* | 3/2006 | Kim et al. .................... 348/360 |
| 2006/0061891 A1* | 3/2006 | Ito et al. ...................... 359/824 |
| 2007/0018070 A1* | 1/2007 | Dames .................... 250/201.1 |
| 2007/0133972 A1* | 6/2007 | Lee et al. .................... 396/133 |
| 2008/0238254 A1 | 10/2008 | Zhou et al. |
| 2008/0259466 A1* | 10/2008 | Avital et al. ................. 359/696 |

FOREIGN PATENT DOCUMENTS

| | | |
|---|---|---|
| CN | 200510114849.2 | 11/2008 |
| EP | 1959511 | 8/2008 |
| WO | WO2007/056952 | 5/2007 |

* cited by examiner

INTEGRATED OPTICAL FOCUSING/ZOOMING SYSTEM

BACKGROUND OF THE INVENTION

1. Field of the Invention

The present invention relates to optics, more particularly, to an integrated optical auto focus and zooming system.

2. Description of Related Art

In the current optical auto focus and zooming systems, a conventional motor is generally used to drive an optical lens (or lens set) through a transmission mechanism, such that the structure is complex. In addition, since conventional motors have a relatively high rotating speed, mostly, a speed-restraining mechanism is required additionally. As a result, the structure becomes even more complex, and the transmission efficiency of the system is reduced.

Lately ultrasonic motors (e.g., U.S. Pat. No. 6,940,209) that utilize the reverse piezoelectric effect of piezoelectric materials and a driving mechanism formed by a specific design are adopted, which consist of only functional members such as a stator and a rotor with piezoelectric elements fixed on the stator. Since ultrasonic motors have the advantages of low rotating speed and simple transmission mechanism, they provide a good alternative for driving the optical auto focus and zooming system.

However, when an optical lens is driven by the torque output from an ultrasonic motor via the motor shaft, transmission parts and/or connection parts are required additionally to transfer the torque to the lens, leading to the following disadvantages: first, the structural complexity is increased; second, the fabricating cost is increased; and third, the precision, the stability, and the reliability of the operation of the optical lens are greatly limited by the transmission parts or by the connection parts.

SUMMARY OF THE INVENTION

The present invention provides an integrated optical auto focus and zooming system, which has a simple structure and high transmission efficiency, and is capable of convenient focus and zoom adjustments. The integrated system combines motor and lens into a single body and hence completely eliminates the need of the transmission or connection parts.

Technical Method

The present invention provides an integrated optical auto focus and zooming system, which includes a first optical lens (or lens set), a first hollow casing, a second hollow casing, and a plurality of piezoelectric elements. The first and second casings typically have a barrel shape. The first optical lens is placed in the first hollow casing, the first hollow casing and the second hollow casing are screwed together with each other, and the plurality of piezoelectric elements are attached either on the first hollow casing or on the second hollow casing. When the plurality of piezoelectric elements are excited to generate mechanical vibrations, a traveling wave is generated on the attached casing, which then drives the other casing to rotate along with the screw threads, and simultaneously to move along axial direction due to the characteristics of screw motion.

External threads are formed on an outer surface of the first hollow casing and internal threads matching with the external threads are formed on an inner surface of the second hollow casing.

The plurality of piezoelectric elements are fixed on the second casing, so to perform the excitation of a traveling vibration wave on the internal threads of the second casing, driving the first casing to rotate and to move axially relative to the second casing.

In an alternative design, internal threads are formed on an inner surface of the first hollow casing, and external threads matching with the internal threads are formed on an outer surface of the second hollow casing.

Still the plurality of piezoelectric elements are fixed in the first casing close to the external threads, so to perform the excitation of a traveling vibration wave on the external threads of the first casing, driving the first casing to rotate and to move axially relative to the second casing.

An example of the piezoelectric elements is piezoelectric ceramic plates. Each piezoelectric ceramic plate is attached on the first or second casing.

The second casing includes an image sensor centered on the axis of the second casing.

An aperture is opened in the first casing.

The second casing may contain a second optical lens or lens set.

In simple embodiments (e.g., auto focus lens), the lens system may contain only the first and the second casings. However, in complicated embodiments (e.g., zoom lens), more lens sets may be included, as described below.

The second casing can still contain a third optical lens or lens set such that the first casing containing the first optical lens therein is placed between the second optical lens (or lens set) and third optical lens (or lens set).

A third hollow casing may be further included with a fourth optical lens being installed in the third hollow casing. External threads matching with the internal threads in the second casing are formed on an outer surface of the third casing, so to receive the traveling vibration wave generated on the internal threads on the second casing by the plurality of piezoelectric elements, which can then drive the third casing to rotate and move axially relative to the second casing.

The thread surfaces of all casings are treated to bear abrasions or coated with an abrasion resistant material.

The internal threads are continuous or segmental, and the external threads are continuous or segmental.

The pitch of the threads on the third casing is the same as or different from that of the threads on the first casing.

Similarly, in the second casing, the pitch of the threads corresponding to the third casing is the same as or different from that corresponding to the first casing.

With the above technical method, the present invention has the following useful technical effects: 1. By means of directly placing the optical lens in the first casing, the first casing is screwed with the second casing; the piezoelectric elements excite mechanical vibrations on the threads to generate a traveling wave on the second casing, so to induce a relative rotation between the two casings through frictional force. Then, the rotation is converted to an axial motion of the lens via the threads, realizing a direct drive of the lens. Therefore, it is easy to achieve focus adjustment for the optical lens, and it has the advantages of large torque due to the direct driving, high transmission efficiency, high precision of the axial positioning through the threads, few parts, and low cost. 2. Using piezoelectric elements to generate the driving torque yields the advantages of easy miniaturization, quick starting and stopping, application in hard environmental conditions (polar region, space etc.), easy and precise positioning, high reliability, no electromagnetic interferences, and low noise. Furthermore, the screw transmission mechanism also provides a self-locking torque, consuming zero power in the focused state. 3. The fabricating cost is low. Since the direct driving system does not require a speed-restraining system, transmission parts such as gears and bearings are saved, so the structure is greatly simplified and reliability increased, leading to easy fabrication of the lens system at low cost. For example, to build a lens device with auto focus function, a common optical lens with fixed focus on the shelf can be used as the rotor and only the lens holding barrel needs to be manufactured.

For the purpose of comprehending and aforementioned and other objects, characteristics, and advantages of the present invention, preferred embodiments accompanied with figures are now described below in detail.

It is to be understood that both the foregoing general description and the following detailed description are exemplary but not limitative, and serve only to provide further explanations of the invention as claimed.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF EMBODIMENTS

The present invention is further described below through the embodiments with reference to the accompanying drawings.

First Embodiment

Figure 1:
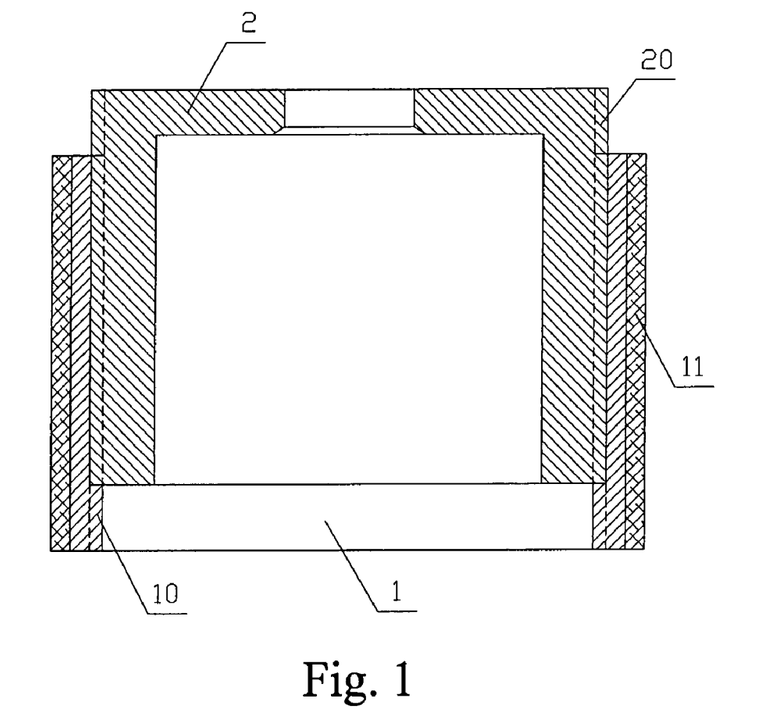
FIG. 1 is a schematic cross-sectional view of a connection relation between the first casing and the second casing according to a first embodiment of the present invention.
Figure 2:
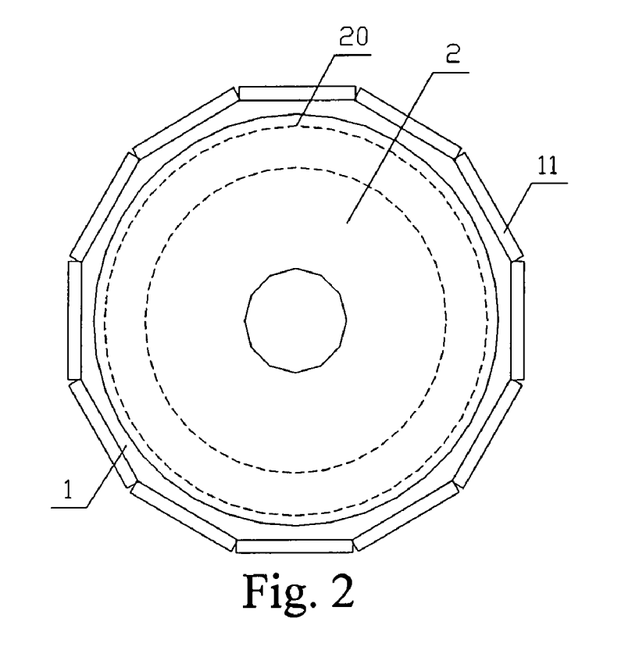
FIG. 2 is a schematic top view of FIG. 1.

As shown in FIGS. 1 and 2, an integrated optical auto focus system includes a ring-shaped first casing 2 and a second casing 1 with a cylindrical center hole. The outer surface of the second casing 1 is a regular dodecahedron, twelve piezoelectric elements 11 (the piezoelectric elements 11 may be piezoelectric ceramics, and may be flake-shaped, arc-shaped, column-shaped, or various polyhedron-shaped, overall ring-shaped, cone-shaped, or piecewise circular piezoelectric elements) are respectively adhered on to each of the twelve surface segments of the regular dodecahedron. The second casing 1 is screwed into the first casing 2 through the cylindrical center hole, and the second casing 1 and the first casing 2 are connected through threads at positions where they are in contact. The internal threads 10 are fabricated on the inner wall of the cylindrical center hole of the second casing 1, and the corresponding external threads 20 are fabricated on the outer surface of the first casing 2. The surfaces of the threads 10 and the threads 20 are treated to be abrasion resistant or coated with an abrasion resistant material.

Figure 3:
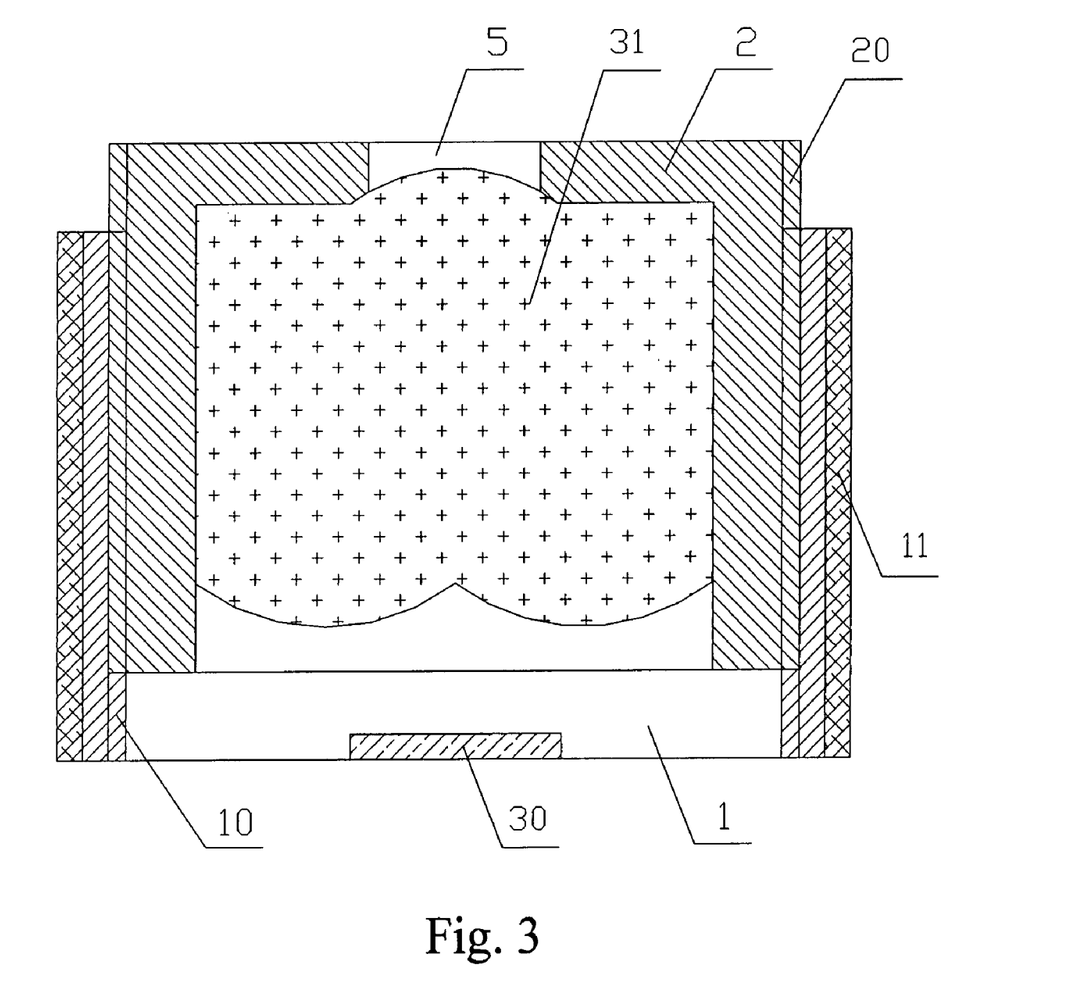
FIG. 3 is a schematic cross-sectional view of an integrated optical auto focus system according to the first embodiment of the present invention.

As shown in FIG. 3, an optical lens 31 is placed in the first casing 2, an image sensor 30 is placed in the center position of one end in the second casing 1, and an aperture 5 is opened at the center position of one end away from the image sensor 30 in the first casing 2.

During the operation, an alternating voltage of a certain frequency is applied to the piezoelectric elements 11 to excite mechanical vibrations on the second casing 1 where the piezoelectric elements 11 are attached to, so as to generate the traveling wave circularly. The second casing 1 is fixed, and the traveling wave around the circle of that casing drives directly the threads 20 of the first casing 2 through the surfaces of the internal threads 10 on the second casing 1 with frictional force, so as to propel the first casing 2 to rotate relatively to the second casing 1. The rotation of the first casing 2 also causes an axial movement relative to the second casing 1 due to the characteristics of screw motion, so that the distance between the optical lens 31 fixed in the first casing 2 and the image sensor 30 fixed in the second casing 1 is changed to achieve focus adjustment.

Second Embodiment

Figure 4:
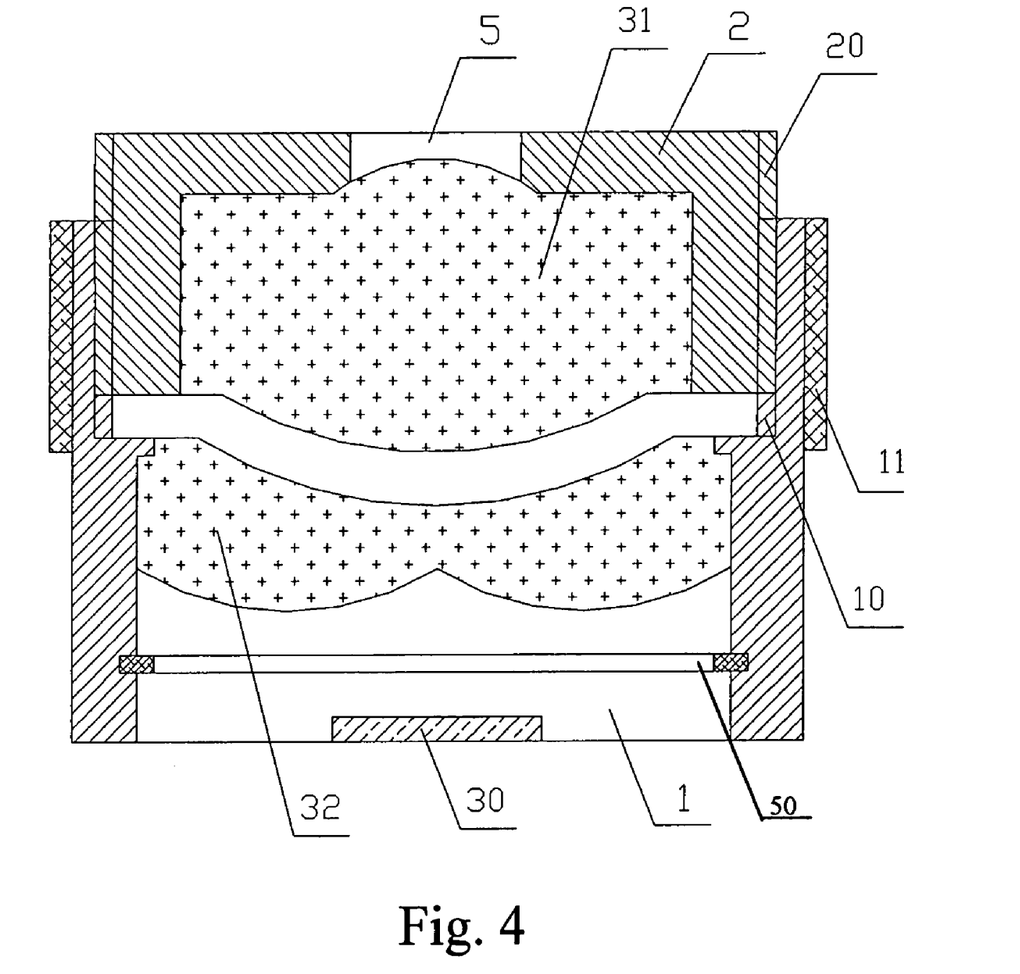
FIG. 4 is a schematic cross-sectional view of another integrated optical auto focus or zooming system according to a second embodiment of the present invention.

Another integrated optical auto focus and zooming system is shown in FIG. 4. The main difference between FIG. 4 of this embodiment and FIG. 3 of the first embodiment lies in that, in this embodiment of FIG. 4, the second optical lens 32 is placed in the second casing 1, so as to achieve larger focus adjustment range or to reduce the weight of moving parts. As a common practice, an infrared cut glass 50 is placed between the second optical lens 32 and the image sensor 30, so as to prevent infrared light from passing there through. The structures of the other parts in FIG. 4 are the same as or similar to that of FIG. 3 in the first embodiment, which thus will not be described herein.

Third Embodiment

Figure 5:
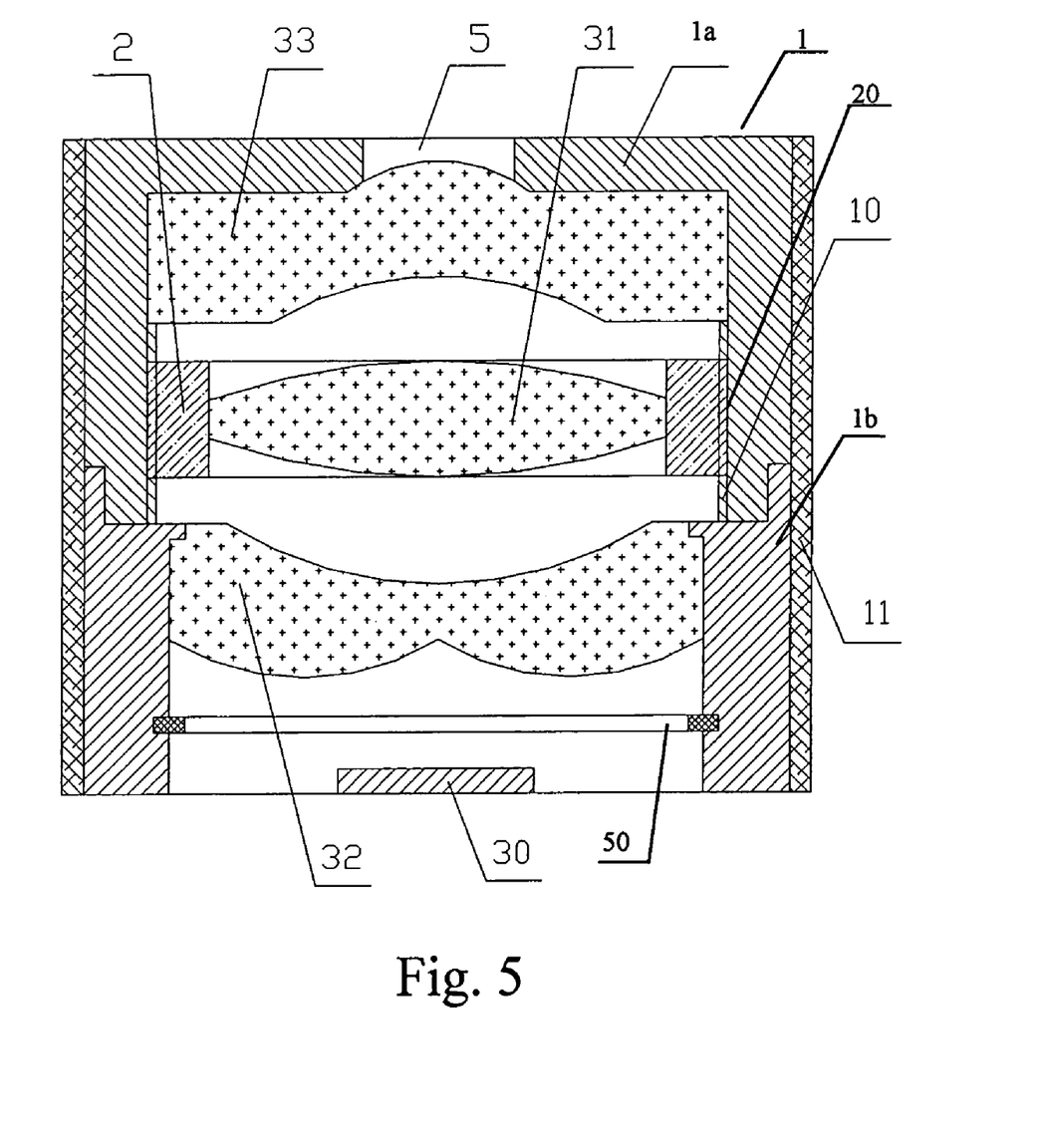
FIG. 5 is a schematic cross-sectional view of still another integrated optical zooming system according to a third embodiment of the present invention.

As shown in FIG. 5, a third integrated optical auto focus and zooming system includes a ring-shaped first casing 2 and a second casing 1 having a cylindrical center hole. A second optical lens 32 and a third optical lens 33 are placed in the second casing 1. The optical lens 31 is placed in the first casing 2, and the first casing 2 is embedded between the second optical lens 32 and the third optical lens 33 in the second casing 1 and is wrapped by second casing 1 through screw matching. The external threads 20 placed on the cylindrical surface of the first casing 2 are screwed and connected with the internal threads 10 on the inner wall of the second casing 1. The outer side surface of the second casing 1 is a regular dodecahedron, and twelve piezoelectric elements 11 are respectively adhered on to each of the twelve surface segments of the regular dodecahedron. The image sensor 30 is placed at the center position of one end in the second casing 1, an aperture 5 is opened at the center position of the other end in the second casing 1, and an infrared cut glass 50 is further placed between the second optical lens 32 and the image sensor 30 to prevent infrared light from passing there through.

In order to conveniently assemble the first casing 2 into the second casing 1, the second casing 1 as shown in FIG. 5 is formed by two parts: a second casing 1a and a second casing 1b. Firstly, the first casing 2 is screwed into the second casing 1a containing the internal threads 10 by means of screwing connection, and then, the second casing 1b having the second optical lens 32 is adhered and fixed with the second casing 1a.

In this embodiment, an alternating voltage is applied on the piezoelectric elements 11 on the second casing 1 to excite vibrations, so as to generate a circular traveling wave along the cylindrical surface to drive the first casing 2 to rotate, and thence the optical lens 31 in the first casing 2 to move, thus achieving focus adjustment.

Fourth Embodiment

Figure 6:
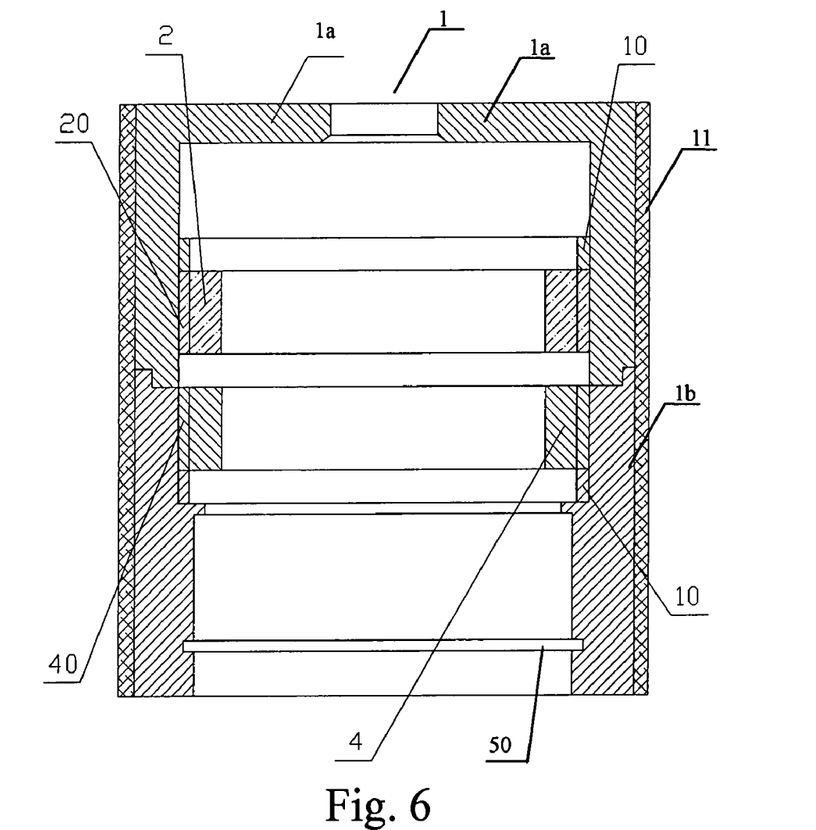
FIG. 6 is a schematic cross-sectional view of the connection relation between the first casing, the second casing, and the third casing according to a fourth embodiment of the present invention, forming a still another integrated auto focus and zooming system in one enclosure.
Figure 7:
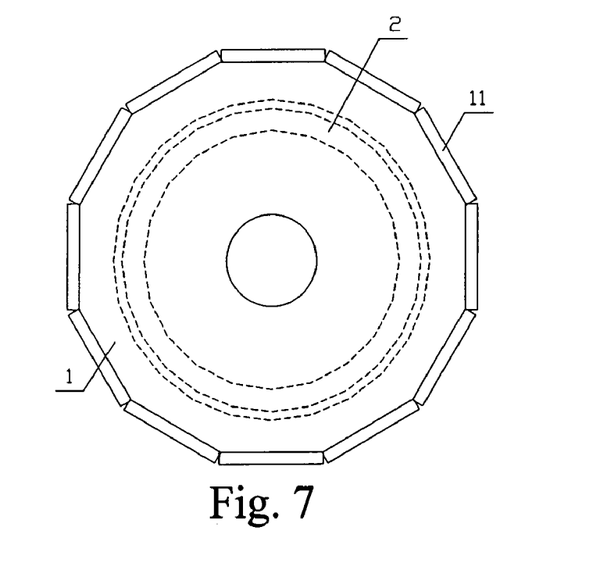
FIG. 7 is a schematic top view of FIG. 6.
Figure 8:
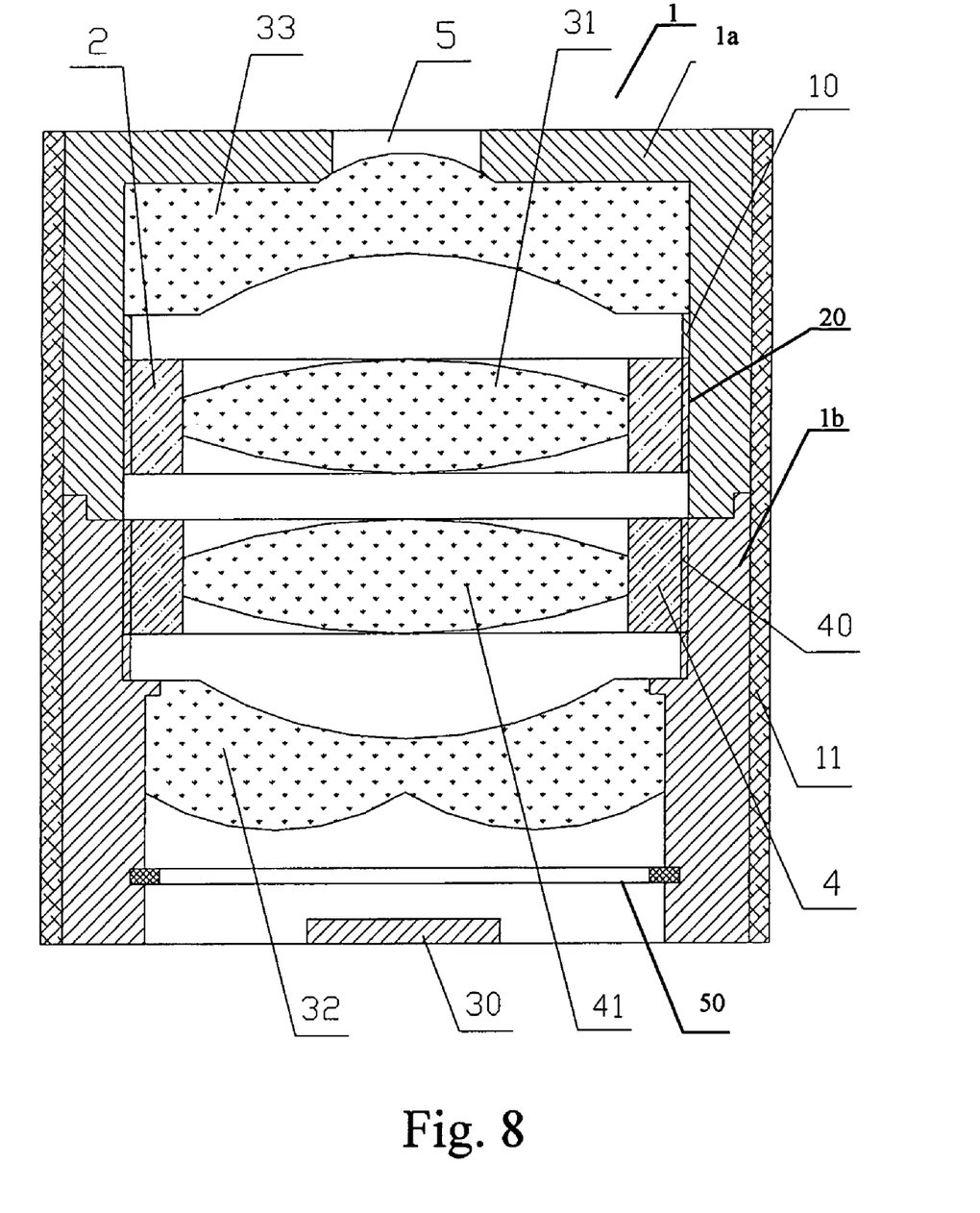
FIG. 8 is a schematic cross-sectional view of yet another integrated optical auto focus and zooming system in one enclosure according to the fourth embodiment of the present invention.

As shown in FIGS. 6, 7 and 8, still a fourth integrated optical auto focus and zooming system includes a ring-shaped first casing 2, and a second casing 1 and a third casing 4 having a cylindrical center hole. The second optical lens 32 and the third optical lens 33 are placed in the second casing 1, and the optical lens 31 is placed in the first casing 2. A fourth optical lens 41 is placed in the third casing 4, and the first casing 2 and the third casing 4 are both placed between the second optical lens 32 and the third optical lens 33 in the second casing 1. The external threads 20 on the cylindrical surface of the first casing 2 are screwed and connected with the internal threads 10 on the inner wall of the second casing 1. The external threads 40 on the cylindrical surface of the third casing 4 are connected with the internal threads 10 on the inner wall of the second casing 1. The outer surface of the second casing 1 is a regular dodecahedron, and twelve piezoelectric elements 11 are respectively adhered on to each of the twelve surface segments of the regular dodecahedron. The image sensor 30 is placed at the center position of one end in the second casing 1, an aperture 5 is opened at the center position of the other end in the second casing 1, and an infrared cut glass 50 is further placed between the second optical lens 32 and the image sensor 30, so as to prevent the infrared lights from passing there through.

In order to conveniently assemble the first casing 2 into the second casing 1, the second casing 1 as shown in FIG. 5 is formed by two parts: a second casing 1a and a second casing 1b. Firstly, the first casing 2 and the third casing 4 is screwed into the second casing 1a having the internal threads 10 and 40 in the manner of screwing connection, and then, the second casing 1b having the second optical lens 32 is adhered and fixed with the second casing 1a.

In this embodiment, after an alternating voltage of certain frequencies is applied on the piezoelectric elements 11, the second casing 1 and the third casing 4 can be rotated independently at different frequencies, due to the effects between the threads 10 and 20, as well as 10 and 40. Relative axial movements are also achieved between the second casing 1 and the first casing 2, as well as between the second casing 1 and the third casing 4. Therefore, the distances between the optical lenses and the image sensor are changed, so as to achieve the simple or combined optical focusing and zooming.

It should be noted that, the above described embodiments serve only to demonstrate and illustrate the present invention, but not to limit the protection scope of the present invention. It will be apparent to those of ordinary skill in the art that various modifications and variations can be made without departing from the scope or spirits of the present invention, which also fall within the protection scope of the present invention.

In the above embodiments, the first casing and the second casing are preferably ring-shaped. However, those of ordinary skill in the art can understand that, the intrinsic requirement for the first casing is that the first casing must be a hollow structure capable of fixing the optical lens and capable of being disposed with threads or spiral guide for the rotation on the surface. The intrinsic requirement for the second casing is that, the second casing must be capable of forming internal threads on the inner surface, the first casing and the second casing can be connected by means of screwing and rotating, and the second casing can have the piezoelectric elements being fixed on the surface.

Furthermore, the piezoelectric elements can be fixed on the second casing, and can also be embedded or fixed in the first casing. Any piezoelectric element, not just piezoelectric ceramics, can be used as long as it can excite mechanical vibrations on the attached casing to generate the traveling wave, so as to generate the relative rotational motion and the relative axial movement with the other casing.

Furthermore, the section of the threads 10 and the threads 20 can be of various shapes, such as triangle, trapezium, rectangle, convex, and any combination thereof. The threads 10 and the threads 20 can be continuous, segmental, or curved with specific tracks, so long as converting the rotation to a relative axial movement can be achieved between the second casing 1 and the first casing 2, as well as between the second casing 1 and the third casing 4.

Furthermore, the pitch of the threads 40 in the third casing 4 can be the same as or different from that of the threads 20 on the outer surface of the first casing 2, so as to perform the uniform or variable speed transmission. For example, in the fourth embodiment, the pitch of the threads between the first casing 2 and the third casing 4, and the pitch between the first casing 2 and the second casing 1 can be the same or different, and if they are the same, the axial travel of the first casing 2 is consistent with that of the third casing 4; otherwise, the axial travel of the first casing 2 is different from that of the third casing 4.

Furthermore, in practical applications, the image sensor 30 can be CCD sensor, CMOS sensor or a sensitive film. In addition, the image sensor 30 not only can be fixed in the second casing 1, but also can be relatively fixed in other positions according to the actual requirements, as long as the corresponding imaging functions with respect to the optical lens 31 can be achieved.

Furthermore, in the above embodiments, the optical lenses 31 and 41, the second optical lens 32, and the third optical lens 33 can be a single optical lens element or a lens group according to the practical requirements. As for the relative complicated lens system in the second, third, and fourth embodiments, the optical lenses can be selected to be adapted to the aberration compensation of various optical designs according to the actual requirements.

What is claimed is:

1. An integrated optical auto focus and zooming system; comprising:
   a first optical lens,
   a first hollow casing,
   a second hollow casing, and
   a plurality of piezoelectric elements;
   wherein the first optical lens is placed in the first hollow casing; the first hollow casing and the second hollow casing are screwed and movable with each other; the plurality of piezoelectric elements are attached on the surfaces of either the first hollow casing or the second hollow casing; and upon an excitation of the plurality of piezoelectric elements, a traveling wave is generated on the attached casing, so as to drive the other casing to rotate along with the threads by frictional force and at the same time to move axially.

2. The integrated optical auto focus and zooming system as claimed in claim 1, wherein external threads are formed on an outer surface of the first hollow casing, internal threads are formed on an inner surface of the second hollow casing, such that said internal threads and said external threads are closely matched and engaged with each other; and wherein said piezoelectric elements consist of piezoelectric ceramic plates and are attached on the outer surfaces of the first casing such that the first casing forms an outer stator and the second casing forms an inner rotor.

3. The integrated optical auto focus and zooming system as claimed in claim 2, wherein an aperture is opened in the first casing and an image sensor installed at a center position of one end in the second casing.

4. The integrated optical auto focus and zooming system as claimed in claim 2, wherein a second optical lens is placed in the second casing.

5. The integrated optical auto focus and zooming system as claimed in claim 2, wherein the plurality of piezoelectric elements are fixed in the first casing close to the external threads; and the plurality of piezoelectric elements excite vibrations on the external threads of the first casing, such that the first casing drives the second casing to rotate along with the threads and to move axially.

6. The integrated optical auto focus and zooming system as claimed in claim 2, further comprising a third hollow easing that has another optical lens installed inside its hole and has external threads matching with the internal threads in the first casing formed on its outer surface; and the plurality of piezoelectric elements excite vibrations on the first casing, such that relative rotation is generated between the third casing and the first casing.

7. The integrated optical auto focus and zooming system as claimed in claim 2, wherein the plurality of piezoelectric elements is placed on the surfaces of the first casing; and the plurality of piezoelectric elements excite mechanical vibrations on the internal threads of the second casing so to generate a traveling wave which drives through friction the second casing to rotate and achieve an axial movement relative to the first casing by the motion guiding of the said threads.

8. The integrated optical auto focus and zooming system as claimed in claim 2, wherein the second optical lens and a third casing containing a third optical lens are placed in the first casing, and the first casing with the first optical lens being placed therein is located between the second optical lens and the third optical lens.

9. The integrated optical auto focus and zooming system as claimed in claim 8, wherein said third casing engages with the first casing with movable threads and the pitch of the threads for the third casing is the same as or different from the pitch of the threads for the first casing.

10. The integrated optical auto focus and zooming system as claimed in claim 1, wherein internal threads are formed on an inner surface of the second hollow casing, external threads are formed on an outer surface of the first hollow casing, such that said internal threads and said external threads are closely matched and engaged with each other; and said piezoelectric elements consist of piezoelectric ceramic plates and are attached on the inner surfaces of the second casing such that the second casing forms an inner stator and the first casing forms an outer rotor.

11. The integrated optical auto focus and zooming system as claimed in claim 10, wherein an aperture is opened in the first casing and an image sensor installed at a center position of one end in the second casing.

12. The integrated optical auto focus and zooming system as claimed in claim 10, wherein a second optical lens is placed in the second casing.

13. The integrated optical auto focus and zooming system as claimed in claim 10, wherein the plurality of piezoelectric elements are placed on the surfaces of the second casing; and the plurality of piezoelectric elements excite mechanical vibrations on the internal threads of the first casing to generate a traveling wave which drives, through friction force, the first casing to rotate and achieve an axial movement relative to the second casing along said threads.

14. The integrated optical auto focus and zooming system as claimed in claim 10, wherein the second optical lens and a third optical lens are placed in the second casing, and the first casing with the first optical lens being placed therein is located above or below both of the second optical lens and the third optical lens.

15. The integrated optical auto focus and zooming system as claimed in claim 14, wherein said third casing engages with the first casing with movable threads and the pitch of the threads for the third casing is the same as or different from the pitch of the threads for the first casing.

16. The integrated optical auto focus and zooming system as claimed in claim 1, wherein the internal and external threads are continuous or segmental.

* * * * *